(12) United States Patent
Linde et al.

(10) Patent No.: US 11,618,544 B2
(45) Date of Patent: Apr. 4, 2023

(54) METHOD FOR PRODUCING A STRUCTURAL SECTION OF A VEHICLE

(71) Applicant: Airbus Operations GmbH, Hamburg (DE)

(72) Inventors: Peter Linde, Hamburg (DE); Markus Müller, Hamburg (DE); Markus Feiler, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1132 days.

(21) Appl. No.: 16/199,886

(22) Filed: Nov. 26, 2018

(65) Prior Publication Data

US 2019/0161154 A1 May 30, 2019

(30) Foreign Application Priority Data

Nov. 30, 2017 (DE) .................... 10 2017 128 496.6

(51) Int. Cl.
| | |
|---|---|
| *B64C 1/06* | (2006.01) |
| *B64C 1/12* | (2006.01) |
| *B64F 5/10* | (2017.01) |
| *B29D 99/00* | (2010.01) |
| *B29C 70/08* | (2006.01) |

(Continued)

(52) U.S. Cl.
CPC ............ *B64C 1/069* (2013.01); *B29C 70/086* (2013.01); *B29D 99/0014* (2013.01); *B64C 1/12* (2013.01); *B64F 5/10* (2017.01); *B29K 2071/00* (2013.01); *B29L 2031/3082* (2013.01); *B64C 2001/0072* (2013.01)

(58) Field of Classification Search
None
See application file for complete search history.

(56) References Cited

U.S. PATENT DOCUMENTS

| | | | |
|---|---|---|---|
| 7,166,251 B2 * | 1/2007 | Blankinship | ............ B29C 70/32 425/441 |
| 8,302,312 B2 | 11/2012 | Stephan | |

(Continued)

FOREIGN PATENT DOCUMENTS

| | | |
|---|---|---|
| DE | 36 05 256 C2 | 3/1991 |
| DE | 101 34 852 B4 | 8/2002 |

(Continued)

OTHER PUBLICATIONS

German Search Report; priority document.

*Primary Examiner* — Barbara J Musser
(74) *Attorney, Agent, or Firm* — Greer, Burns & Crain, Ltd.

(57) ABSTRACT

A method for producing a structural section of a vehicle comprises the steps of providing multiple separate skin panels of a fiber-reinforced plastic having an inner side, an outer side and a border running peripherally around the respective skin panel; arranging at least one stiffening component of a fiber-reinforced plastic on each skin panel, on the respective inner side; integrally connecting the respective at least one stiffening component to the skin panels concerned to form a structural component; arranging at least two structural components on a carrier, so that at least regions of the borders of the structural components concerned are in surface-area contact; and integrally connecting the regions of the borders that are in surface-area contact to one another.

11 Claims, 4 Drawing Sheets

(51) Int. Cl.
  *B29K 71/00*    (2006.01)
  *B64C 1/00*    (2006.01)
  *B29L 31/30*    (2006.01)

(56) References Cited

U.S. PATENT DOCUMENTS

| | | | | |
|---|---|---|---|---|
| 8,876,053 | B2 * | 11/2014 | Moreau | B64C 1/12 |
| | | | | 244/131 |
| 8,889,050 | B2 | 11/2014 | Nitsch | |
| 8,914,979 | B2 * | 12/2014 | Venskus | B23Q 1/012 |
| | | | | 29/897 |
| 8,939,406 | B2 * | 1/2015 | Dopker | B64C 1/069 |
| | | | | 244/119 |
| 9,138,958 | B2 | 9/2015 | Goehlich et al. | |
| 9,199,417 | B1 * | 12/2015 | Rotter | B29D 99/0014 |
| 2009/0277994 | A1 * | 11/2009 | Lobato | B64C 1/061 |
| | | | | 244/119 |
| 2015/0083860 | A1 * | 3/2015 | Frauen | B64C 1/068 |
| | | | | 244/119 |
| 2016/0375629 | A1 * | 12/2016 | Matsen | B29C 66/131 |
| | | | | 156/245 |

FOREIGN PATENT DOCUMENTS

| | | |
|---|---|---|
| DE | 10 2007 044 387 A1 | 4/2009 |
| DE | 10 2009 002 697 B4 | 11/2010 |
| DE | 10 2011 085 937 B4 | 5/2013 |
| DE | 10 2012 015 666 A1 | 2/2014 |

* cited by examiner

METHOD FOR PRODUCING A STRUCTURAL SECTION OF A VEHICLE

CROSS-REFERENCES TO RELATED APPLICATIONS

This application claims the benefit of the German patent application No. 10 2017 128 496.6 filed on Nov. 30, 2017, the entire disclosures of which are incorporated herein by way of reference.

BACKGROUND OF THE INVENTION

The invention relates to a method for producing a fuselage section of an aircraft and to a fuselage section or a fuselage of an aircraft that is produced by such a method.

The production of commercial aircraft usually involves large-format fuselage components being riveted together. The riveting leads to a considerable number of riveted connections, allowing a flux of force between two skin panels connected to one another to take place over a large surface area and over many redundant connections. To reduce the number of rivets to be used, the size of the skin panels or the like that are to be connected to one another may be increased. It is known to use skin panels of 10 m and more in length. While riveted connections originate from the fabrication of metal components, riveted connections can similarly be used when using fiber-reinforced plastics.

The production of riveted connections is relatively complex and cost-intensive, because each riveted connection requires a drilled hole, the deburring and cleaning of the drilled hole, the introducing of a sealant and finally the introducing and deforming of the rivet. When connecting large-format skin panels of commercial aircraft, a very high number of riveted connections occur.

DE 10 2007 044 387 A1 shows a method for producing a fuselage cell of an aircraft, multiple large-format fuselage sections that lie one behind the other being joined together.

SUMMARY OF THE INVENTION

It would be helpful to have an alternative method for producing fuselage sections, fuselage subassemblies or structural sections in which at least some riveted connections could be rendered unnecessary. This method should be suitable in particular for the connection of fuselage components or other structural sections that consist of fiber-reinforced plastics, and in particular fiber-reinforced thermoplastics.

An object of the invention is consequently that of proposing an alternative method for producing a structural section or a structural subassembly of a vehicle with which not only a reliable and strong connection between individual skin panels or the like is made possible, but with which a particularly still more homogeneous flux of force and a still further improved surface quality can be achieved.

A method for producing a structural section of a vehicle is proposed. The method comprises the steps of providing multiple separate skin panels of a fiber-reinforced plastic having an inner side, an outer side and a border running peripherally around the respective skin panel; arranging at least one stiffening component of a fiber-reinforced plastic on each skin panel, on the respective inner side; integrally connecting the respective at least one stiffening component to the skin panels concerned to form a structural component; arranging at least two structural components on a carrier, so that at least regions of the borders of the skin panels concerned are in surface-area contact; and integrally connecting the regions of the borders that are in surface-area contact to one another.

A separate skin panel may be understood as meaning a particularly sheet-like component, which may form a portion of a larger structural section, for example of a larger fuselage section. The size of a skin panel may be chosen on the basis of several aspects. On the one hand, choosing a smaller size of a skin panel has the effect of allowing its ease of handling to be improved. However, the number of borders to be connected to one another of multiple skin panels would increase as a result. On the other hand, by integration of the respective at least one stiffening component, the individual skin panels may provide a functional unit or functional module that can represent a specific partial region, for instance a window with an associated stiffening or a door region with an associated stiffening. It may be advisable to make the size of the skin panel suit an individual function.

The subdivision of a larger structural section into smaller parts can facilitate the production of the structural section overall. The smaller parts, which are referred to here as structural components, may be produced in a highly automated process chain. In a way similar to in the case of automobile production, more complexly shaped structural components can also be produced with high precision and at high speed, in particular in an integral type of construction. The flexibility of the design and fitments of these structural components can be increased significantly by relatively easy adaptation of smaller production plants. On account of the relatively small sizes of the structural components, apart from their facilitated transport, in particular over greater distances, improved stockkeeping can also be achieved. This allows the production of a high number of identical structural components and their intermediate storage before the process chain is switched over to another structural component or another group of structural components.

The fiber-reinforced material of the skin panels may be configured in the form of a thermoplastic matrix material or a thermoset matrix material with reinforcing fibers embedded therein. The material composition of the skin panels is not restricted to specific matrix materials. Rather, all conceivable matrix materials that can in particular be used in an automated process should be taken into consideration, if they meet the strength requirements for the structural components. The reinforcing fibers could particularly comprise carbon fibers.

The layers of a skin panel that are arranged one on top of the other do not necessarily have to have identical circumferential contours. Rather, differently designed layers may also be used, resulting in a skin panel thickness that is not constant. This allows for instance the formation of thickened regions for the arrangement of peripheral door or window stiffenings.

When using a thermoset matrix material, the integral connecting of the at least one stiffening component and the skin panels and also the individual structural components may be performed by adhesive bonding. In the case of thermoplastics, however, welding should be considered. Two components to be welded to one another can be integrally connected to one another by pressing one onto the other and at least locally heating just a joining region. This may involve using tools that can accomplish the holding or pressing and the heating of the joining region to a welding temperature suitable for the thermoplastic material. These tools may also be designed for maintaining the desired shape of the parts being joined under the influence of the heating. Alternatively possible for this would also be connecting methods in which the skin panels and the stiffening components concerned or multiple structural components brought into surface-area contact are completely heated and welded to one another.

The integral connecting of the individual component parts of a structural component may also furthermore concern an integral type of construction of the overall structural component. All of the component parts may be produced by a common build-up of layers and be jointly cured or co-consolidated. The steps presented individually above may also be performed at the same time or in a different sequence.

On each skin panel, at least one first stiffening component may be arranged on the respective inner side of the skin panel. A stiffening component may for instance be an elongated component, which leads to a pronounced projection on the inner side of the skin panel concerned, and thereby increases the area moment of inertia of the combination of skin panel and stiffening component. It can be appreciated that not only a single stiffening component, but also multiple stiffening components may be arranged on the respective skin panel. Depending on the function of the skin panel concerned, the stiffening components may be on it at a distance from one another and/or crossing one another. It goes without saying that the method according to the invention is not restricted to specific stiffening components, but can be implemented with any desired stiffening components of an open and/or closed profile cross section.

The integral connecting of the at least one stiffening component to the respective skin panel has the effect of producing a stiffened skin panel that is of a virtually monolithic construction.

Arranging two structural components on a carrier, which is for instance a placement frame, also allows a surface-area contact to be carried out between the skin panels of two adjacent structural components. The integral connecting of the regions of the borders of two structural components that are in surface-area contact produces a group of structural components or a structural section of the vehicle.

In this way, sometimes a multiplicity of such stiffened skin panels or structural components from a highly automated production process can be put together and connected to one another. This obviates the need for producing individual large-format skin panels in one piece by complex manual or partly automated methods. If a fuselage of an aircraft, in particular a cylindrical fuselage, is to be produced by the production method according to the invention, the individual structural components allow barrel-like fuselage sections to be put together.

In an advantageous embodiment, the provision of a skin panel comprises placing at least two layers one on top of the other in a mold and integrally connecting the layers to one another, each layer having a circumferential contour and an offset being formed between the circumferential contours of two layers lying one on top of the other. The borders of a skin panel or of a fuselage component formed therewith may consequently have a stair-shaped form. For putting together multiple structural components by surface-area contact of at least one region of the borders, consequently all of the structural components should be designed to correspond to one another. The stepped design of the borders allows a particularly distinct surface-area contact, which aligns the structural components with one another. Furthermore, an improved local build-up of a mechanical pressure can take place. The design of the borders allows the formation in the border regions of fiber structures overlapping with one another, which leads to improved strength of the assembly made up of multiple skin panels.

It should be noted at this point that a skin panel that is not built up from multiple layers offset in relation to one another could also be used. The borders of such a skin panel may be scarfed in some other way, in order to allow an alignment and large-area contact of multiple structural components.

In a way analogous to this, the provision of the at least one stiffening component may comprise placing at least two layers one on top of the other in a mold, subsequently integrally connecting the layers to form the stiffening component, placing the stiffening component onto the skin panel and subsequently integrally connecting it to the skin panel. The production of a stiffening component may, in particular, be performed separately from the step of producing a sheet-like base of a skin panel. A profile of the stiffening component may have a significantly greater curvature than the layers of the skin panel, since a more pronounced projection has to be produced by the stiffening component. The stiffening component to be placed onto the skin panel may have at least one flat flange, which is to be brought into surface-area contact with the inner side of the skin panel concerned. If the stiffening component concerned is formed in the manner of a stringer, the stiffening component could be restricted to the use of a single flange of this type. If, however, a larger, rib-like stiffening component is considered, two flat flanges running parallel to one another may also be provided and both have to be brought into surface-area contact with the skin panel. It goes without saying that these are just examples; any desired variants of stiffening components with one or more flanges are conceivable. Depending on the configuration, a cavity may be enclosed between the stiffening component and the inner side of the skin panel concerned. After placing on the at least one stiffening component, the skin panel is integrally connected to it, so that a strong assembly with monolithic properties is created.

By analogy with the layers of the skin panel, the layers of the at least one stiffening component may be arranged in such a way that an offset is formed between the circumferential contours of two layers lying one on top of the other. Consequently, like the skin panels themselves, the stiffening components of two adjacent structural components or structural components to be connected can be brought into stepped surface-area contact, in order to be subsequently welded to one another.

It should likewise be noted that the structural component can be produced from a skin panel with a stiffening component in one piece. This obviates the need for separately connecting the skin panel to the at least one stiffening component.

In a particularly preferred embodiment, the at least one stiffening component is arranged with an offset in relation to the skin panel in such a way that one end of the stiffening component protrudes beyond a border of the skin panel and an opposite end of the stiffening component is at a distance from an opposite border of the skin panel. Two structural components that are brought into surface-area contact at the borders consequently allow a partial overlapping of a surface-area contact between the structural components and the stiffening component concerned. This allows the stiffening component concerned also to be welded in each case directly to another skin panel of the adjacent structural component, so that the courses of fibers of all the components concerned overlap one another even better.

In a further advantageous embodiment, the structural components are produced directly in a handling tool. The handling tool can facilitate improved handling for an automated or semiautomated joining process, since the handling tool may be set up for gripping a corresponding device and the structural component does not have to be gripped itself.

It goes without saying that alternatively the individual structural components may also be gripped without such a handling tool, for example by using suckers or the like, which carry out a temporary frictional connection with the outer side concerned of the skin panel.

In a particularly preferred embodiment, by arranging multiple structural components in rows, individual area segments with an uninterrupted circumference are provided, in particular as a fuselage section of an aircraft. For example, the formation of an uninterrupted chain of structural components may lead to an uninterrupted circumferential contour. This would be particularly helpful for the production of an elongated fuselage of an aircraft. Depending on the width of the individual structural components, an uninterrupted circumferential contour can provide a kind of ring, which represents a defined axial fuselage section. On the other hand, arranging multiple structural components in rows in the form of a matrix can lead to the formation of a half-shell or at least a larger skin segment of a body of a vehicle.

The method may also comprise the arranging of a carrier for the defined placing of individual structural components, and also the successive placing of individual structural components onto the carrier and the respectively subsequent integral connecting of adjacent structural components. The carrier may preferably be adjusted, particularly between a retracted position and an extended position. It is preferred if the carrier in an extended position provides bearing points for the individual structural components in the desired end position and in the retracted position allows the carrier to move within a finished structural section. In the production of a fuselage section of an aircraft, the carrier could for instance be compacted in a radial direction, so that in this way a circumferential contour that is formed by multiple bearing points is made smaller. After the successive placing and integral connecting of the individual fuselage components, in particular of a contiguous fuselage section, the carrier could be compacted and removed from the then finished fuselage section, in order either to produce a further fuselage section or to be removed from the area of the fuselage entirely. This allows fully automatic production of at least one structural section. The carrier may be configured as a placement frame.

Handling of the individual structural components may be achieved by way of a multi-axis robot, a correspondingly adapted multi-axis guide or the like. This allows an automated device to move each structural component to a location intended for it and to place it on corresponding bearing points of the carrier or placement frame. An additional device for heating a joining zone may be provided, and may be either on the carrier, on the handling tool or introduced separately into the joining zone.

The fiber-reinforced plastic for providing the skin panels and/or the stiffening component comprises a matrix material of a thermoset with reinforcing fibers embedded therein. Suitable as matrix material are all commonly used, particularly heat-curable resins. The specific matrix material may depend on the intended use of the structural component. The reinforcing fibers may furthermore likewise be chosen depending on the intended use, and by way of example comprise carbon fibers, glass fibers, aramid fibers, Kevlar fibers and the like.

It goes without saying that the individual layers of a skin panel and/or a stiffening component may be joined by joint curing.

When a thermoset with reinforcing fibers is used, the integral connecting of two structural components may comprise adhesive bonding.

In a further advantageous embodiment, the fiber-reinforced plastic for providing the skin panels and/or the reinforcing component may comprise a matrix material of a thermoplastic with reinforcing fibers embedded therein. The suitable thermoplastic materials for realizing the matrix may comprise PPS (polyphenylene sulfide), PEEK (polyetheretherketone), PEKK (polyetherketoneketone) or others. The use of a thermoplastic material further increases the flexibility of the design and fitments of the structural component, since the addition and integration of fitment elements can be significantly facilitated by local melting in comparison with the production of a preform of dry or preimpregnated fibers that is to be infiltrated with resin.

Equally, in the production of structural components from a thermoplastic material, the integral connecting of structural components may comprise welding by at least locally heating a joining zone of the structural components.

The invention also relates to a vehicle with a structural section that consists of multiple structural components and is produced by a method according to the description given above.

The vehicle may be an aircraft. Furthermore, the structural section may be an uninterrupted fuselage segment of an aircraft fuselage.

BRIEF DESCRIPTION OF THE DRAWINGS

Further features, advantages and application possibilities of the present invention emerge from the following description of the exemplary embodiments and the figures. In these, all of the features described and/or graphically presented form by themselves and in any desired combination the subject matter of the invention, even independently of how they are grouped together in the individual claims or the way in which the claims refer back to one another. Furthermore, in the figures the same designations stand for objects that are the same or similar.

DETAILED DESCRIPTION OF EXEMPLARY EMBODIMENTS

Figure 1A:
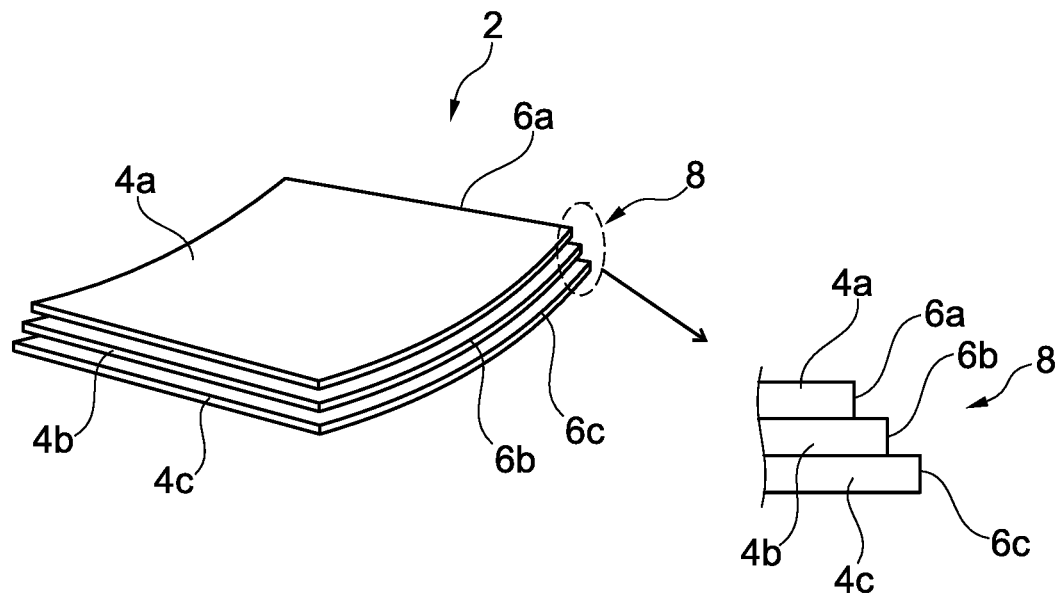
FIGS. 1a to 1c show the structure of a fuselage section with multiple details in various representations.
Figure 1B:
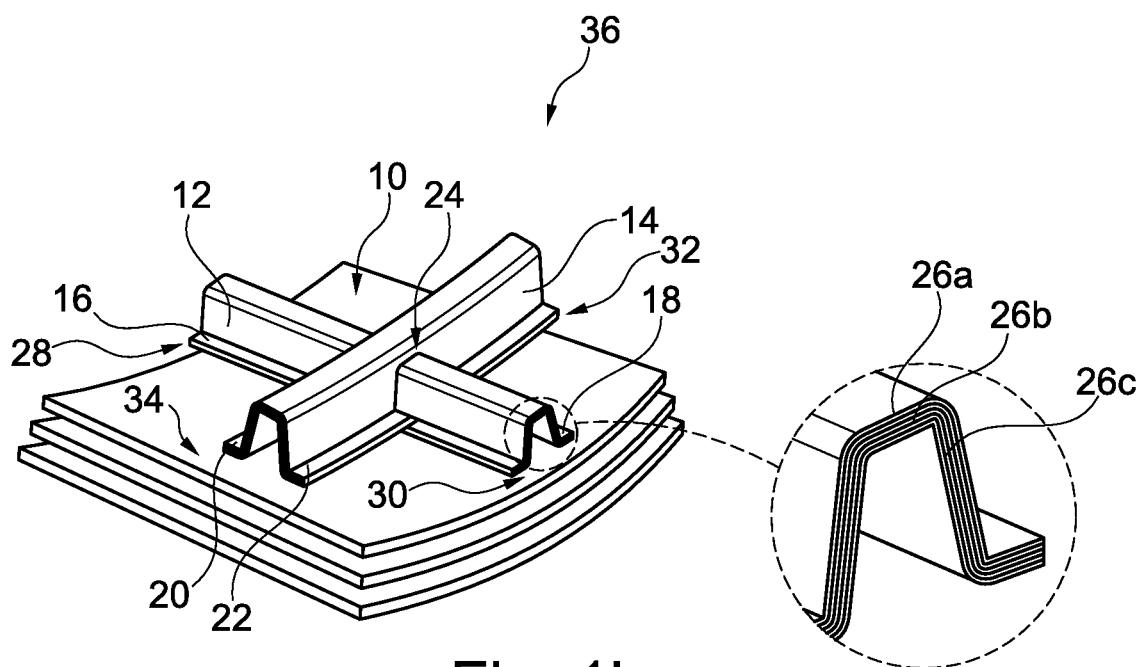
Figure 1C:
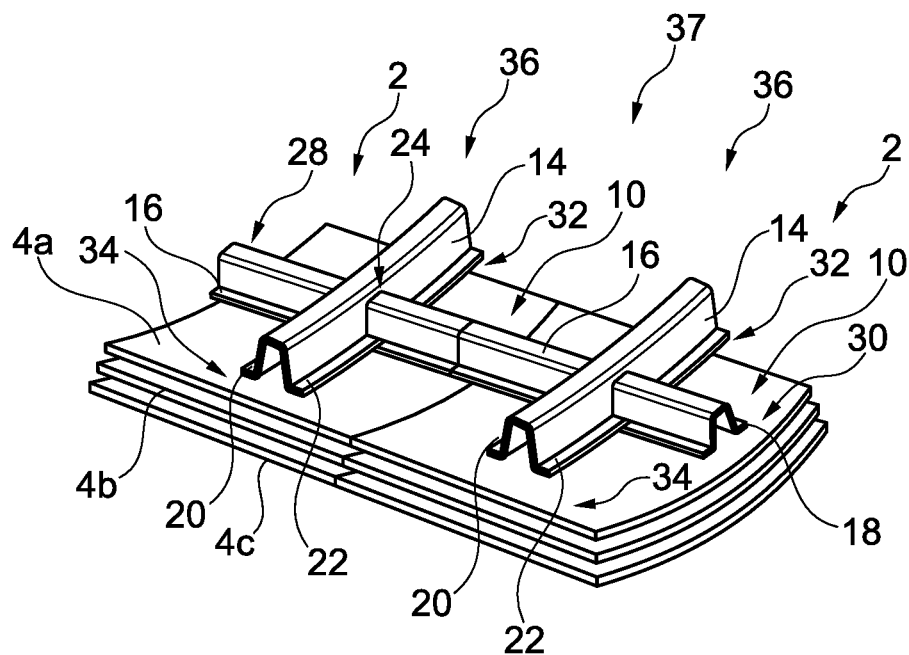

FIGS. 1a-c show, by way of example, a skin panel 2, which in this example is produced from multiple layers 4a, 4b and 4c of a thermoplastic, fiber-reinforced material. By way of example and for reasons of simplicity of the representation, for this purpose the three layers 4a, 4b and 4c of identical dimensions lie one on top of the other and are welded to one another. Each of the layers 4a, 4b and 4c has a peripheral circumferential contour 6a, 6b and 6c, which, because of the rectangular shape shown by way of example, is made up here in each case of four edges. The layers 4a, 4*b* and 4*c* have a slight offset in relation to one another, so that a stair-shaped structure is formed at a border 8 of the skin panel 2. The border 8 is consequently scarfed.

In FIG. 1*b*, the skin panel 2 from FIG. 1*a* is shown, on the inner side 10 of which, by way of example, two stiffening components 12 and 14 are arranged. These are, by way of example, likewise produced from a thermoplastic, fiber-reinforced material. In the representation shown here, both stiffening components 12 and 14 have two flanges 16 and 18 and 20 and 22, with which the stiffening components 12 and 14 are directly in contact and flush with the inner side 10 of the skin panel 2. At these regions, the stiffening components 12 and 14 are welded to the skin panel 2.

The stiffening component 14 has, by way of example, a clearance 24, through which the stiffening component 12 extends. As is evident from the curvature, the stiffening component 14 may be part of a rib, while the stiffening component 12 may be part of a longitudinal stiffening element (stringer). However, the clearance 24 is not absolutely necessary. The stiffening components 12 and 14 may also be jointly produced in such a way as to match one another. For example, both stiffening components 12 and 14 could be integrally produced by an injection-molding technique and have an integral crossing point.

The individual stiffening components 12 and 14 may likewise be produced from multiple layers 26*a*, 26*b* and 26*c*, which are positioned with an offset in relation to one another. This may be realized in a way analogous to the layers 4*a*, 4*b* and 4*c* of the skin panel 2.

Moreover, the stiffening components 12 and 14 are positioned with a slight offset on the inner side 10, so that in each case a region of the stiffening component 12 and 14 protrudes beyond the border 8 of the skin panel 2 or is at a distance from it on the inner side 10. Thus, the stiffening component 12 forms an overhang 28, and a gap 30 on an opposite side of the stiffening component 12. By analogy with this, the stiffening component 14 forms an overhang 32 and, on an opposite side, a gap 34. Overhangs 28 and 32 should be dimensioned to correspond to the respective gap 30 or 34.

The advantages achieved as a result of this are represented in FIG. 1*c*. The stepped or scarfed configurations of the borders 8 of multiple skin panels 2 may be configured in a way corresponding to one another, so that, by using the stair structure, the borders 8 of two skin panels 2 lie flush one on top of the other. Since fibers respectively extend in the individual layers 4*a*, 4*b* and 4*c*, they can be made to overlap with respectively adjacent layers 4*a*, 4*b* and 4*c* as a result of the stepped design.

Moreover, the overhangs 28 can be used to produce an overlap with an adjacent skin panel 2. The arrangement of the fiber structure and the size of the connecting area can in this way be positively influenced. Consequently, a structural section 37 can be produced from multiple virtually monolithic structural components 36 that are connected to one another.

Figure 2:
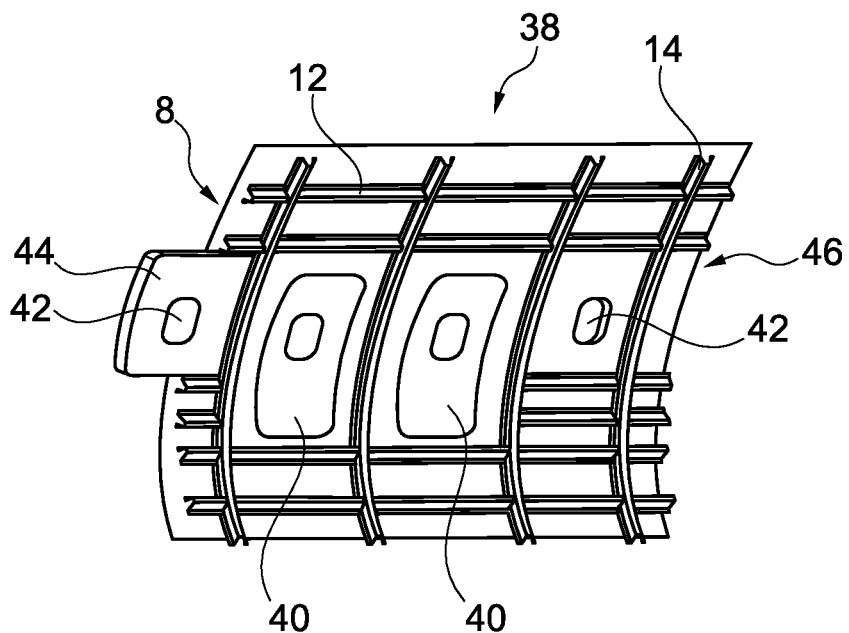
FIG. 2 shows a fuselage component as a functional unit given by way of example.

FIG. 2 shows a larger structural component 38, which can be used as a finished, functional module for producing a structural section. This structural component 38 can extend over a greater surface area than for example the structural component in FIG. 1*a*. However, here, too, multiple stiffening components 12 and 14 that stiffen the underlying skin panel 2 are provided.

The structural component 38 has, by way of example, cutouts 40 for emergency exits and window cutouts 42. By analogy with the example shown in FIG. 1*b*, the borders 8 may have a step-like structure. Moreover, a projection 44 and a clearance 46, which are designed to correspond largely to one another, are respectively provided in the plane of the skin panel 2. During the connection to a structural component following in the axial direction (not shown), an overlap can be produced, as already represented in FIG. 1*c*. A particular advantage lies in the subdivision of a larger structural section into multiple structural components 38, which are easier to produce and to handle. Being made of a fiber-reinforced thermoplastic material also allows a facilitated one-piece type of construction of stiffened regions of the structural component. Furthermore, it is conceivable that the structural component 38 is already made up of multiple structural components 36 from FIGS. 1*a* to 1*c*.

Figure 3A:
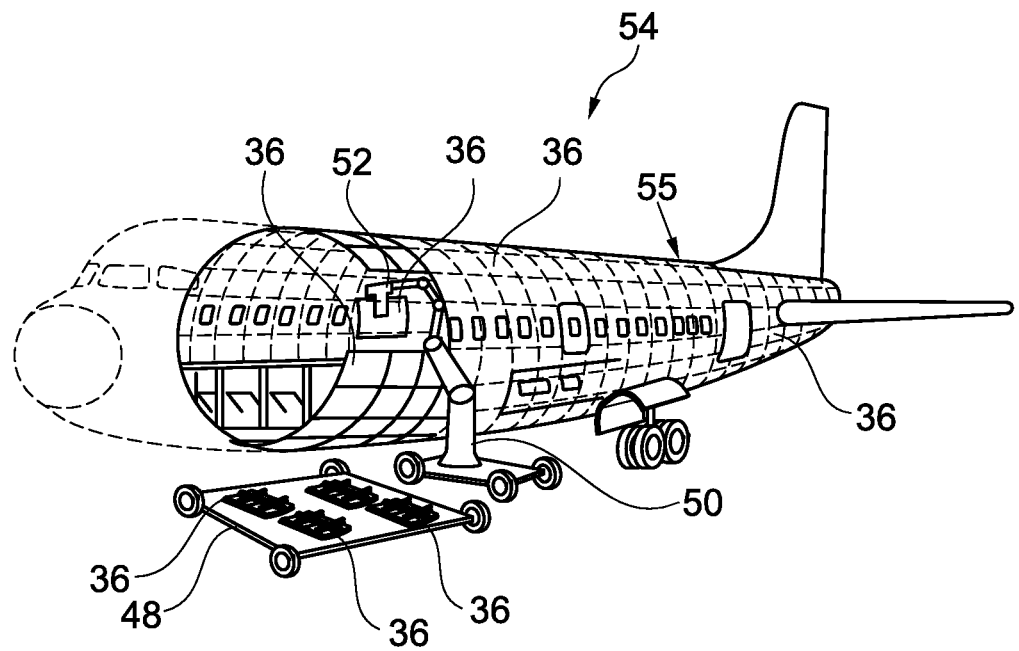
FIGS. 3a to 3b show the automated production of a fuselage section.
Figure 3B:
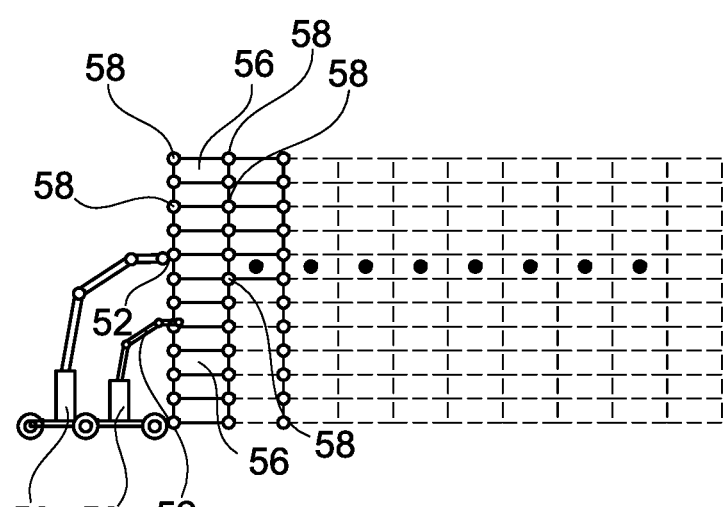

FIGS. 3*a* and 3*b* schematically show necessary or advantageous devices for automatically carrying out the production of a fuselage section. FIG. 3*a* first shows a transporting carrier 48, with the aid of which multiple structural components 36 could be transported and temporarily stored. This is only shown by way of example; vertically aligned carriers or holding frames, with which transport between various production units can be carried out, are also conceivable. The structural components 36 stored here may by way of example be gripped by a multi-axis robot 50 with the aid of a gripping tool 52. As represented in FIG. 3*a*, multiple structural components 36 may be arranged in rows, in order in this way to produce peripheral structural sections 55 of a fuselage 54. These could also be referred to as annular shell sections, circumferential segments or fuselage segments.

The individual structural components 36 are at least locally heated in joining zones, so that the thermoplastic material comprising reinforcing fibers melts and two structural components 36 in contact with one another are integrally connected to one another. The joining region between the structural components 36 may be heated by inductive processes, the use of heating resistors, by transmission or other methods.

For placing the individual structural components 36 in a predefined position, a carrier 56, which is configured as a placement frame and provides multiple holding points 58 on which the individual structural components 36 can be placed, may be used. In particular, the joining zones should be arranged on adjacent holding points 58, so that at least the joining zones lie in a position that is spatially defined very precisely, in order to be connected there to the adjacent parts. It goes without saying that it would also be conceivable to use multiple multi-axis robots 50, which appropriately position multiple structural components 36 simultaneously.

It may also be advantageous to use not only the smaller structural components 36 from FIGS. 1*a* to 1*c* but also larger structural components 38, which could be made up of multiple smaller structural components 36.

Figure 4:
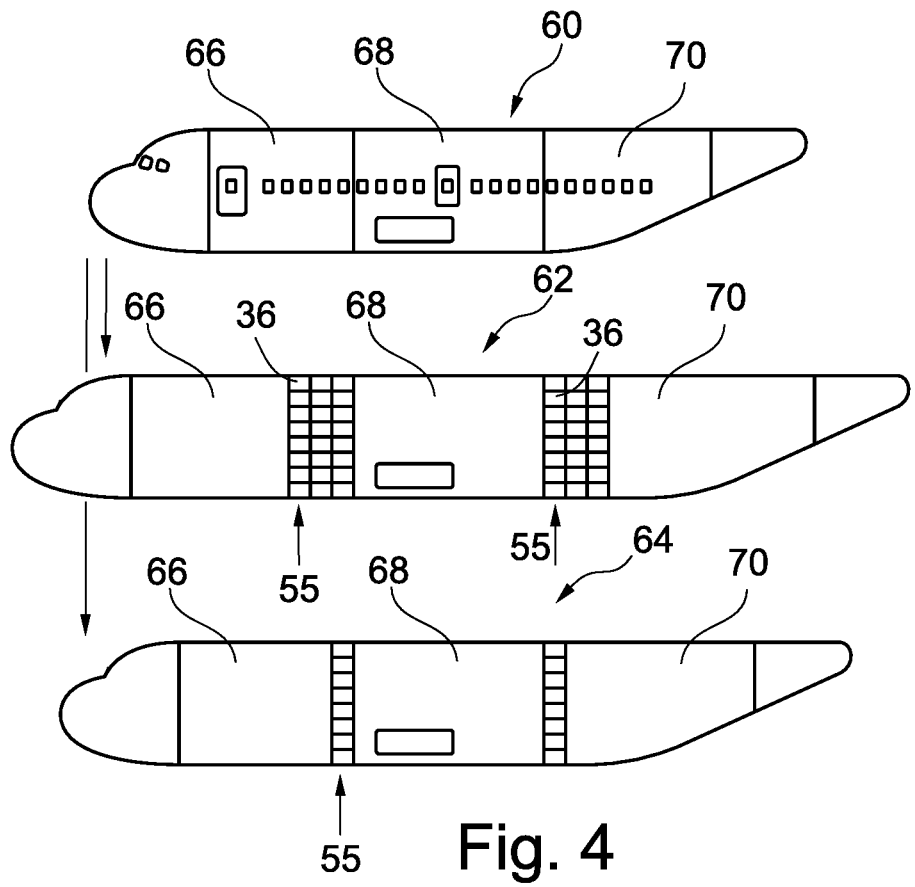
FIG. 4 shows the possibility of modifying a fuselage by inserting a differing number of additional fuselage sections.

Apart from facilitated, automatable production and the production of a substantially monolithic fuselage 54 by using a multiplicity of individual structural components 38 that can be easily handled and can be produced in an automated process, the method according to the invention also makes further advantages possible. Represented by way of example in FIG. 4*a* are three aircraft fuselages 60, 62 and 64, which have identical core dimensions, but differ in length and the outfitting of a middle fuselage section.

The aircraft fuselage 60, for instance, is the shortest of the three aircraft fuselages and merely comprises—at least in this representation—three fuselage barrels 66, 68 and 70. These may have been produced by the method according to the invention, or in some other way. The aircraft fuselage 62 shown vertically in the middle differs from the shorter aircraft fuselage 60 by a lengthening of the middle fuselage barrel 68, by way of example, by altogether six peripheral structural sections 55 comprising structural components 36 adjoining one another. These may have been produced by the method according to the invention and serve for modifying the fuselage 60 to achieve a greater length and a greater number of passenger seats. These additionally inserted shell sections 55 may be designed appropriately for the relevant loads and, to the extent feasible, allow individualization of an aircraft. A further example is shown by the aircraft fuselage 64 lying thereunder, which only comprises two additional peripheral shell sections 55, and consequently has a smaller lengthening. Altogether, the method according to the invention can consequently also be used in addition to other, established methods.

Figure 5:
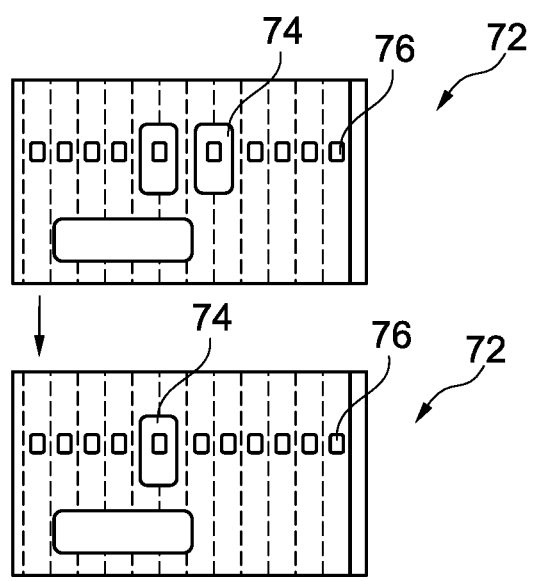
FIG. 5 shows different functional units as a fuselage component.

As represented in FIG. 5, an easy individualization of a structural section 72 can also be achieved by the method according to the invention by adaptation of emergency escape hatches 74, arrangement of windows 76 and the like.

It should additionally be pointed out that "having/comprising" does not exclude other elements or steps and "a" or "an" does not exclude more than one. Furthermore, it should be pointed out that features that have been described with reference to one of the above exemplary embodiments can also be used in combination with other features of other exemplary embodiments described above. Designations in the claims should not be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a structural section of a vehicle, comprising the steps of:
    providing multiple separate skin panels of a fiber-reinforced plastic having an inner side, an outer side and a border running peripherally around the respective skin panel,
    arranging at least one stiffening component of a fiber-reinforced plastic on each skin panel, on the respective inner side,
    integrally connecting the respective at least one stiffening component to the skin panels concerned to form a structural component,
    arranging at least two structural components on a carrier, so that at least regions of the borders of the skin panels concerned of the structural components are in surface-area contact,
    integrally connecting the regions of the borders that are in surface-area contact to one another, and
    compacting and removing the carrier from the connected at least two structural components,
    wherein the at least one stiffening component is arranged with an offset in relation to the skin panel in such a way that one end of the stiffening component protrudes beyond a border of the skin panel and an opposite end of the stiffening component is at a distance from an opposite border of the skin panel.

2. The method according to claim 1, the step of providing multiple skin panels comprising, for each skin panel, placing at least two layers one on top of the other in a mold and integrally connecting the layers, each layer having a circumferential contour and an offset being formed between the circumferential contours of two layers lying one on top of the other.

3. The method according to claim 1, including wherein the step of arranging at least one stiffening component comprises forming the at least one stiffening component by placing at least two layers, one on top of the other in a mold, subsequently integrally connecting the layers to form the stiffening component, and placing the stiffening component onto the skin panel and subsequently integrally connecting the stiffening component.

4. The method according to claim 3, wherein each layer of the stiffening component has a circumferential contour and an offset being formed between the circumferential contours of two layers lying one on top of the other.

5. The method according to claim 1, further comprising arranging multiple structural components in rows to form individual area segments with an uninterrupted circumference.

6. The method according to claim 1, further comprising arranging the carrier for a defined placing of individual structural components, and
    successive placing of individual structural components onto the carrier and the respectively subsequent integral connecting of adjacent structural components.

7. The method according to claim 6, wherein at least the placing of the structural components onto the carrier being performed by a multi-axis robot.

8. The method according to claim 1, wherein the fiber-reinforced plastic for providing at least one of the skin panels or the stiffening component comprises a matrix material of a thermoset with reinforcing fibers embedded therein.

9. The method according to claim 8, wherein the integral connecting of two structural components comprises adhesive bonding.

10. The method according to claim 1, wherein the fiber-reinforced plastic for providing at least one of the skin panels or the stiffening component comprises a matrix material of a thermoplastic with reinforcing fibers embedded therein.

11. The method according to claim 10, wherein the integral connecting of structural components comprises welding by at least locally heating a joining zone of the structural components.

* * * * *